United States Patent [19]

Shimizu et al.

[11] 4,145,130
[45] Mar. 20, 1979

[54] CURRENT SUPPLY RELEASE SYSTEM FOR MAGNETIC MECHANISM

[75] Inventors: Masami Shimizu, Tokyo; Hiroshi Aizawa, Machida; Masayoshi Yamamichi, Kawasaki; Yukio Iura, Yokosuka; Masanori Uchidoi, Kawasaki; Tokuichi Tsunekawa, Yokohama, all of Japan

[73] Assignee: Canon Kabushiki Kaisha, Tokyo, Japan

[21] Appl. No.: 711,294

[22] Filed: Aug. 3, 1976

[30] Foreign Application Priority Data

Aug. 5, 1975 [JP] Japan .................................. 50-95121

[51] Int. Cl.² .............................................. G03B 7/08
[52] U.S. Cl. .................................. 354/51; 354/60 R; 354/234
[58] Field of Search .................... 354/50, 51, 234, 235, 354/60 R, 266, 173

[56] References Cited

U.S. PATENT DOCUMENTS

| 3,940,776 | 2/1976 | Kondo .................................. 354/173 |
| 3,947,855 | 3/1976 | Inoue .................................... 354/50 |
| 4,003,063 | 1/1977 | Takahashi et al. ............. 354/60 R X |
| 4,015,198 | 3/1977 | Iwashita et al. .................. 354/173 X |

Primary Examiner—Michael L. Gellner
Attorney, Agent, or Firm—Toren, McGeady and Stanger

[57] ABSTRACT

In cameras, a magnetic mechanism is used to control various camera operations. In order to reduce current consumption in supplying such magnetic mechanism, the present invention provides an improvement over known designs. The present inventive system for the magnetic mechanism thus presents a second reset member beside the normal reset member for releasing the current supply to the magnetic mechanism. If the current is continued to be supplied to the above mentioned magnetic mechanism by mistake, the above mentioned second reset member interrupts the current supply to the above mentioned magnetic mechanism instead of the normal reset member. In this way, the useless consumption of the battery can be avoided.

7 Claims, 9 Drawing Figures

CURRENT SUPPLY RELEASE SYSTEM FOR MAGNETIC MECHANISM

BACKGROUND OF THE INVENTION

1. Field of the Invention

The present invention relates to a system for releasing the current supply holding state of the magnetic mechanism for controlling various mechanisms by means of magnets or the like, and particularly to a system for releasing the current supply holding state of the magnetic mechanism for controlling the shutter operation and other operations of the camera.

2. Description of the Prior Art

Recently various mechanisms of the motion picture cameras, the photographic camera and so on are increasingly controlled by means of magnets. A remarkably small type of battery is used as the current source in such kinds of cameras because of space limitations.

Thus, it has become one of the most important factors in the designing of camera how small the power consumption by the magnetic mechanisms, which occupies most part of the power consumption of camera, can be reduced.

In order to solve the above mentioned problem, a system for supplying current to the magnetic mechanism only during a very short time has recently been developed for a camera. However, the power consumption of the magnetic mechanism can be reduced remarkably when the sequence operation of the camera is carried out in a normal way. If, for some reason, however the above mentioned sequence operation is disturbed the current may be supplied to the magnetic mechanism permanently. Thus causes the rapid consumption of the small capacity battery, making the photographing impossible.

SUMMARY OF THE INVENTION

A purpose of the present invention is to provide a system for interrupting the continuous current supply state to the magnetic mechanism.

Another purpose of the present invention is to provide a system for automatically interrupting the continuous current supply state to the magnetic mechanism.

Further another purpose of the present invention is to provide a system for interrupting the continuous current supply state to the magnetic mechanism by means of a simple composition.

Further another purpose of the present invention is to offer a system for interrupting the continuous current supply state to the magnetic mechanism by using the current source voltage checker button of the camera.

Further purposes of the present invention will be disclosed out of the explanations to be made later in detail in accordance with the accompanying drawings.

DESCRIPTION OF THE PREFERRED EMBODIMENTS

Figure 1:
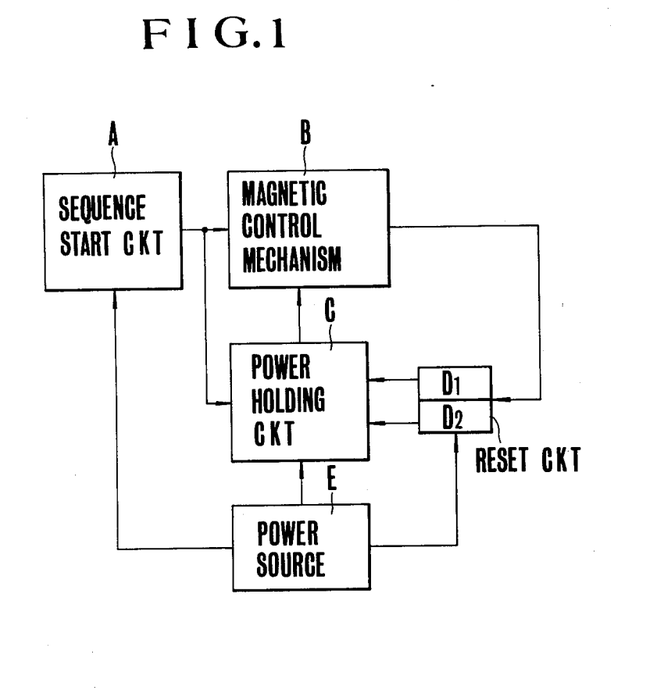
FIG. 1 shows a block diagram for showing the principle of the current supply holding release system for the electromagnetic mechanism in accordance with the present invention.

FIG. 1 shows a block circuit diagram illustrating the principle of the current supply holding release system in accordance with the present invention. In the drawing, A is the sequence start circuit for producing a start signal for starting the photographic operation for example, by means of the shutter release operation of the camera. Further, the signal for starting the sequence operation is produced by making the device ready for operation by means of closing the current source switch of the camera. B is the magnetic control mechanism for controlling various kinds of mechanisms, whereby electrical signals are converted into mechanical operations. C is the current supply holding circuit for holding the current supply from the current source E of the device to the magnetic control mechanism B. $D_1$ is the first reset circuit. When the magnetic control mechanism B has carried out an ordinary operation so as to complete one sequence operation, the termination signal is delivered from B to $D_1$. By means of this termination signal $D_1$ delivers the reset signal to the current supply holding circuit C so as to release the holding. The operation of each part has been described when the operation of the device is in order. When, on the other hand, some irregularities take place in the above mentioned sequence operation due to some cause and the mechanism B does not carry out the normal operation, no termination signal is delivered from B to $D_1$, whereby no reset signal from $D_1$ to C is produced in such a manner that the current supply holding circuit C continues a permanent current supply to the mechanism B so that the current source is consumed in a short time. In order to eliminate such inconveniences as mentioned above, in the case of the system in accordance with the present invention, another reset signal that due to the termination signal from the magnetic control mechanism B is produced by means of the reset circuit $D_2$ so as to reset the current supply holding circuit C in order to release the current supply to the mechanism B.

Figure 2:
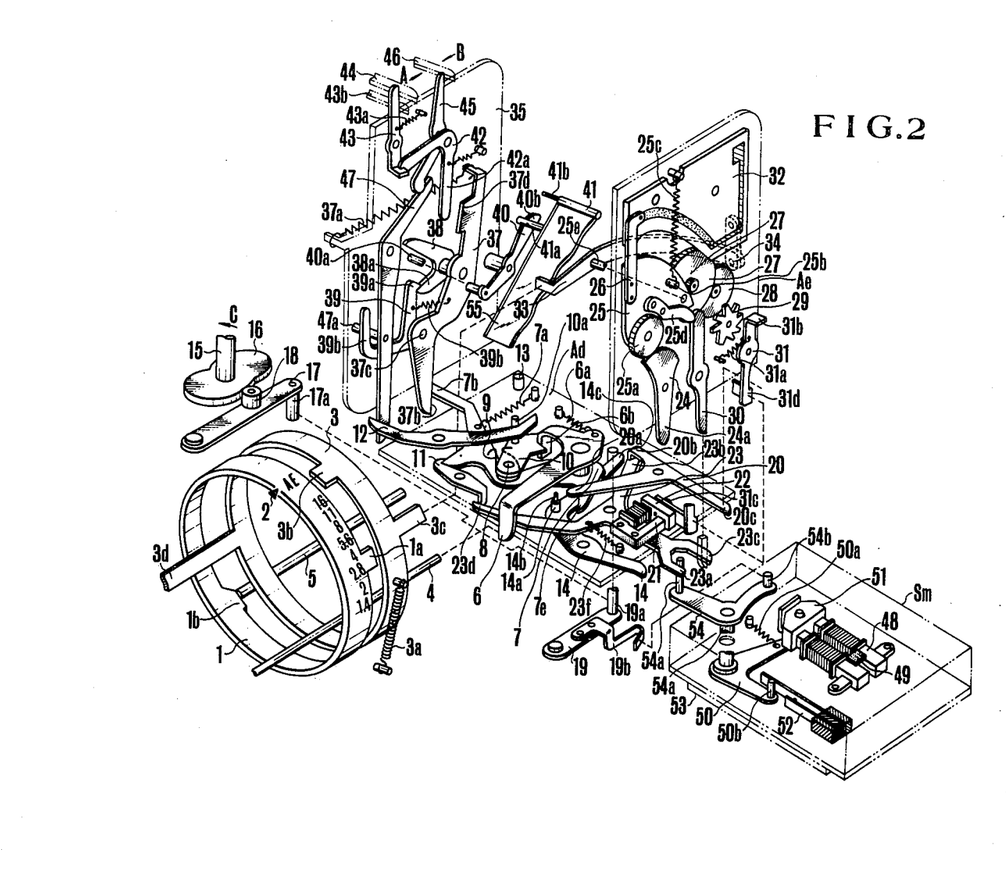
FIG. 2 shows an embodiment of a single reflex camera in which the system in accordance with the present invention is applied.

FIG. 2 shows an embodiment of the current supply holding release system in accordance with the present invention applied to a single reflex camera, particularly the photographic lens and various units in the neighborhood of the mirror box in the camera body in perspective view. Hereby FIG. 2 shows the state when the film has been wound up while the shutter has been charged. 1 is the aperture ring, on which the automatic aperture index AE and the manual aperture index are provided while the projection 1a and the cam part 1b are also provided. 2 is the index for setting the automatic aperture index AE and the manual aperture index. 3 is the aperture preset ring being urged along the clockwise direction by means of the spring 3a and presenting a projection 3b engageable with the projection 1a of the aperture ring 1. Further the aperture preset ring 3 is provided with the arm 3c, which is intended to determine the rotation of the bell crank by means of the lever 3d through the aperture set cam ring, not shown in the drawing, whereby the bell crank controls the rotation of the diaphragm driving ring, not shown in the drawing, so as to determine the opening of the diaphragm. 4 is a pin provided on the diaphragm driving ring, whereby the one end of this pin 4 engages with the automatic aperture lever 6 being urged along the counter-clockwise direction by means of the spring 6a of the automatic aperture unit Ad. This automatic aperture lever 6 presents an upwardly directed part 6b. 5 is the auto-manual change-over signal pin to be moved in functional engagement with the operation for matching the AE index and the manual aperture index on the aperture ring 1 with the index 2. On the automatic aperture lever 6, the automatic aperture energy storing lever 7 is coaxially and rotatably provided. This automatic aperture energy storing lever 7 is urged along the clockwise direction by means of a spring 7a, while in the middle of the one side of the lever 7, a shaft 8 is provided whereby the shaft 8 bears the common lever 10 through the spring 9. The one end of this common lever 10 is engaged with the downwardly directed part 6b of the automatic aperture lever 6, being provided with a pin 10a. Further the automatic aperture energy storing lever 7 presents the engaging claw 11 for keeping the strength of the spring 7a. 12 is the automatic aperture return signal lever, whose one end is provided at the position at which the end engages with the pin 10a of the common lever 10. 13 is the stopper pin for controlling the range of the rotation of the automatic aperture energy storing lever 7. 14 is the charge lever for charging the spring 7a of the automatic aperture energy storing lever 7, whereby the stepped part 14a of the pin provided in the middle of the charge lever 14 engages with 7e of the automatic aperture energy storing lever 7. Further in order to be able to charge the charge lever 14 in functional engagement of the film winding up, a charge cam 16 formed as one body with the shaft in functional engagement of the film winding up lever, not shown in the drawing, a charge transmission lever 17, a roller 18 and a pin 17a provided on the lever 17 are provided. Further at the position opposite to the charge transmission lever 17 an intermediary lever 19 connected with the lever 17 by means of a member not shown in the drawing, whereby a pin 19a is provided on the lever 19. Further in the middle of the intermediary lever 19 a magnet charge plate 19b consisting of an elastic material is fixed. 20 is a three-forked lever for serving as a charge member for making the automatic exposure control magnet 21 attract the amature 22, whereby the first end 20a engages with the stepped part 14a of the pin of the charge lever 14 while the second end 20b is retained by the hook part 23b of the release lever 23. The third end 20c engages with 31d of the stop wheel claw 31 to be explained later. The release lever 23 also assumes a three-forked shape, being urged along the counter-clockwise direction by means of a spring 23f. On the automatic exposure control unit Ae, a charge gear 24 engageable with the charge lever 14 is provided, while the sector gear 25 on which the gear 25a engaging with the charge gear 24, the slide member 26 for resistance and the Ae holding plate 25d are fixed engages with the accelarating gears 27, 28 and the stop wheel 29. Further by means of the pin 25b provided on the sector gear 25 and of the spring 25c, the sector gear 25 is urged along the counter clockwise direction. The spring 25c is designed to be weaker than the spring 3a at the side of the lens. 30 is the Ae holding lever whose one end is retained by the holding plate 25d of the sector gear 25 while the other end engages with a forked part 23c of the release lever 23. 31 is the stop wheel claw being urged along the counter-clockwise direction by means of the spring 31a, whereby the one end presents a claw part 31b for stopping the rotation of the stop wheel 29 while the other end is pivoted by the shaft 31c with the armature 22. 32 is the body of the variable resistance $VR_5$ to be explained later, being intended for the automatic exposure control. 33 is the signal lever whose one end engages with the arm 3c of the aperture preset ring 3, whose middle part is pivoted on the pin 25e provided on the sector gear 25 and whose other end is pivoted on the support lever 34. On the mirror lifting mechanism unit 35, the mirror driving lever 37 engaging with the end 7b of the automatic aperture energy storing lever 7 is provided, whereby the folded upper end of the lever 37 is urged along the counter clockwise direction by means of the spring 37a. On the mirror driving lever 37, the mirror kick up lever 38 is coaxially pivoted so as to engage the hook part 39a of the kick up holding claw 39 pivoted on the shaft 37c provided on the mirror driving lever 37. In this manner, the kick up holding claw 39 is urged along the clockwise direction by means of the spring 39b. The mirror kick up lever 38 engages with the pin 40a provided at the one end of the kick up intermediary lever 40, while the other end engages with the pin 41a provided on the mirror receiving plate 41 (41b is the rotation shaft of the mirror receiving plate 41.) Further the mirror driving lever 37 presents a convex part 37d engaging with the one end 42a of the front shutter plane holding lever 42 while the other end engages with the rising up part of the front shutter plane release lever 43. The upper end of the front shutter plane release lever 43 engages with the front shutter plane fixing lever 44 of the shutter mechanism not shown in the drawing for starting the front shutter plane. 43 is the set lever in functional engagement with the winding up mechanism not shown in the drawing, so as to charge the spring 43a. Further, the rear shutter plane signal lever 45 is provided coaxially with but independently of the front shutter plane holding lever 42, being engaged with the signal lever 46 operated by the termination signal of the rear shutter plane from the shutter mechanism. The other end of the lever 45 engages with the upper end of the mirror return signal lever 47 while the pin 47a provided in the middle of the mirror return signal lever 47 engages with 39b of the kick up holding claw 39. Further, the lower end of the mirror return signal lever 47 also engages with the one end of the automatic aperture return signal lever 12 in the above mentioned Ad unit. In the camera release unit Sm, the magnet 48 with a permanent magnet 49. To the magnet 48 with the permanent magnet 49, the armature holding lever 50 is provided so as to hold the armature 51. The armature holding lever 50 is urged along the counter clockwise direction by means of the spring 50a, whereby the spring is designed to be stronger than the spring 23f of the release lever 23 but weaker than the attractive strength of the permanent magnet 49. Further, a pin 50b is provided at the one end of the armature holding lever 50 so as to be engaged with the memory switch 52. Further, the camera release unit Sm is a frame body consisting of a non-magnetic material for containing the magnet 48, the armature holding lever 50, the memory switch 52 and so on, whereby on the lower surface, a member for insulating the magnetic influence is provided. Further, the whole camera release unit Sm is cased so that the unit is connected by means of the shaft 54a of the start signal lever 54 for taking out the signal of the armature holding lever 50. The pin provided on the start signal lever 54 engages with 23a of the release lever 23 while the pin 54b provided on the other end engages with the magnet charge plate 19b of the intermediary lever 19.

Figure 3:
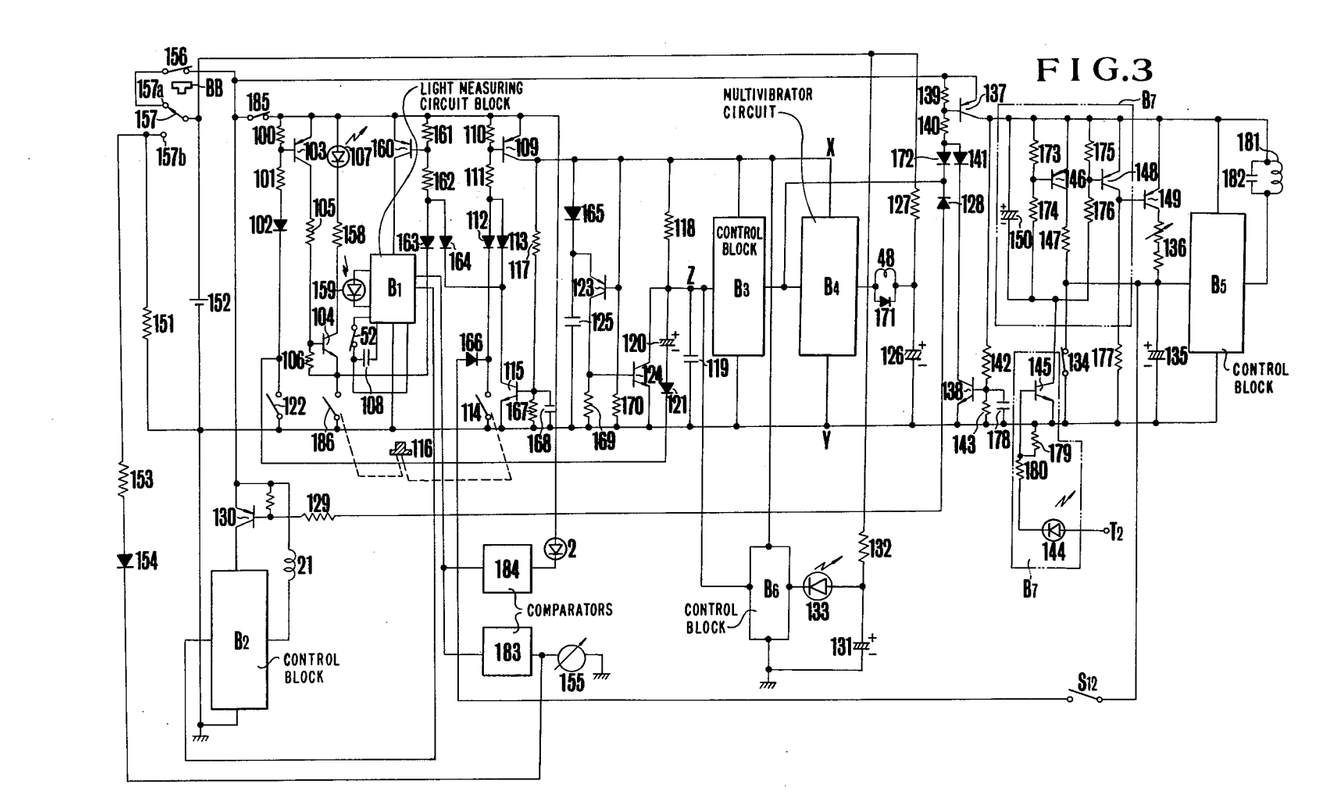
FIG. 3 shows the circuit diagram of the camera shown in FIG. 2.

FIG. 3 shows the circuit diagram of the camera shown in FIG. 2, whereby the elements presenting the same figures as in FIG. 2 present the same functions, so that their explanation is omitted here. In FIG. 3, 100 and 101 are the resistances for composing a voltage dividing circuit, while 102 is the current non-return diode, whereby to the voltage dividing point of the voltage dividing resistance the base of a pnp transistor 103 is connected. 104 is the diode driving transistor whose base is connected to the voltage dividing point of the voltage dividing resistance 105, 106 connected to the collector of the transistor 103 and in whose collector circuit the illuminating diode for the self-timer set display is connected. 108 is the condenser for storing the value of the brightness of the object to be photographed, while 52 is the memory switch which is opened before the lifting up of the mirror 55 in functional engagement of the excitation of the magnet 48 for releasing the mirror quick return mechanism shown in FIG. 2. The memory switch 52 is connected in the block $B_1$ so that the value of the object brightness immediately before the lifting up of the mirror 55 is stored in the condenser 108 as electrical signal. The magnet 48 present the permanent magnet on the yoke in such a manner that it attracts the armature when it is not supplied with current. When the current is supplied with the release operation, the permanent magnet is excited along the reversed direction so as to free the armature. 109 is a transistor whose base is connected to the voltage dividing point of the voltage dividing resistance 110, 111 so as to be connected to the switch 114 through the non-return diode 112 and to the collector of the holding transistor through the non-return diode 113, whereby the both diodes 112 and 113 are connected parallel to each other. The transistor 109 serves as a current supply switch for supplying the current to the control blocks $B_3$ and $B_4$ only in case of necessity, whereby when the switch 114 is closed by pushing the shutter button 116 down to the second step, the transistor 109 is brought in the switched on state in such a manner that by means of the resistance 117, the transistor 115 is brought in the switched on state. When the transistor 115 is brought in the switched on state the base potential of the transistor 109 is kept at the low level, a self-holding circuit is composed in such a manner that the transistor 109 keeps the switched on state even if the shutter button 116 is freed and the switch 114 resumes the opened state. 118 and 119 are the resistance and the condenser of a delay circuit for delaying the start of the camera during the light measuring operation especially at the time of the repeated photographing whereby each impedance value is chosen so as to obtain a time constant of about 10m sec. 120 is the condenser for adjusting the time of the self-timer, being connected to the condenser 119 in parallel and to the self-timer switch 122 through the non-return diode 121. 123 and 124 are respectively the transistors for discharging the condensers 119 and 120 so as to bring them in the reset state and 125 is the condenser for controlling the discharging time. 126 and 127 are the condenser for storing the charge for quick excitation of the starting magnet 48 shown in FIG. 7 and the charge resistance. The output of the control block $B_3$ consisting of a Schmitt-circuit is connected to the base of the transistor 130 through the diode 128 and the resistance 129. Hereby the transistor 130 serves to control the current supply, being connected in the current supply circuit of the control block $B_2$ to be explained later. The control block $B_6$ whose input is connected to the condensers 119 and 120 is the block for predicting the operation of the self-timer, consisting of the conventional Schmitt-circuit, whereby the conductive level of this block is set a little lower than the threshold value of the Schmitt-circuit composing the input part of the control block $B_3$. 131 is the condenser for storing the energy for the illuminating diode 133 while 132 is the resistance for controlling the charge current. The switch 134 is the start switch which is closed by the end of the front shutter plane not shown in the drawing of the shutter shown in FIG. 2 before the start of the front shutter plane and opened at the same time with the start, while 135 is the condenser for adjusting the shutter time, composing a time constant circuit with the variable resistance 136 for daylight photography whose value is controlled by means of the shutter dial. 137 and 138 are the transistors for controlling the current supply to the control block $B_5$ consisting of a Schmitt-circuit. The base of the pnp transistor 137 is connected to the voltage dividing point of the voltage dividing resistance 139, 140 while the collector is connected to the collector of the transistor 138 through the diode 141. Because the base of the transistor 138 is connected to the voltage dividing point of the voltage dividing resistance 142, 143, when the transistor 137 is brought in the switched on state, namely the current supply state the transistor 138 becomes conductive and the base level of the transistor 137 is lowered so as to keep the transistor in the switched on state. 144 is the illuminating diode to be connected to the accessary shoe terminal $T_2$ of the camera, being connected to the neon tube circuit connected to the main capacitor of the conventional flash device in such a manner that when the charge voltage of the main capacitor of the flash device reaches a certain determined value the transistor 145 whose base is connected to the illuminating diode is made conductive. The control block $B_7$ serves to produce a control signal for automatically converting the shutter time into the flash light photographic time by means of the charge completion signal from the flash device, whereby the collector of the transistor 145 is connected to the transistor 146. Consequently, when the transistor 145 is brought in the switched on state the transistor 146 is brought in the switched on state in such a manner that the resistance 147 for the flash light photography is connected in series to the condenser 135. On the other hand because of the switched on state of the transistor 145, the transistors 148 and 149 are brought in the switched off state the the shutter time is set at a time, for example 1/60 sec. convenient for the flash light photography, which is determined by the time constant circuit consisting of the resistance 147 and the condenser 135.

Thus, the condenser 150 connected to the transistor 145 is intended to delay the return of the flash light photographic time to the day light photographic time, being charged with the switched on state of the transistor 145 in order to avoid an instantaneous unstable state of the charge completion signal when the flash device operates. 151 is a dummy resistance presenting a load equivalent to that of the electrical circuit of the camera and being used for checking the voltage of the current source 152. 153 is the level shift resistance for making the proper scale of the meter at the time of the above mentioned checking. 154 is the diode for preventing the current from flowing through the dummy resistance 151 when the meter 155 is used as aperture value indicator. 156 is the switch to be changed over into the switched off state by means of the rear shutter plane through the lever 46 shown in FIG. 2, composing the first reset member. BB is the battery checking button for checking the voltage of the current source 152 and 157 is the change over switch composing the second reset member, presenting the fixed contact pieces 157a and 157b. Hereby the change over switch 157 is changed from the contact piece 157a over to the contact piece 157b in functional engagement of the pushing down of the battery checking button BB. 158 is the resistance connected to the illuminating diode 107 and 159 the photoelectric element for converting the amount of the light from the object into an electrical signal, 160 the pnp transistor, 161 and 162 the resistances, 163, 164, 165 and 166 the diodes, 167 the resistance connected to the base of the npn transistor 124 and the capacitor, 169 the resistance connected to the base of the npn transistor 124, 170 the resistance connected to the base of the pnp transistor 123, 171 the diode for killing noises, 172 the diode connected to the resistance 140, 173–177 the resistances, 178 the capacitor, 179–180 the resistances, 181 the magnet for controlling the rear shutter plane not shown in the drawing, 182 the capacitor and 183 and 184 the comparators.

Below the light measuring circuit block $B_1$ and the control circuit block $B_2$ shown in FIG. 3 will be explained in detail in accordance with FIG. 4.

Figure 4:
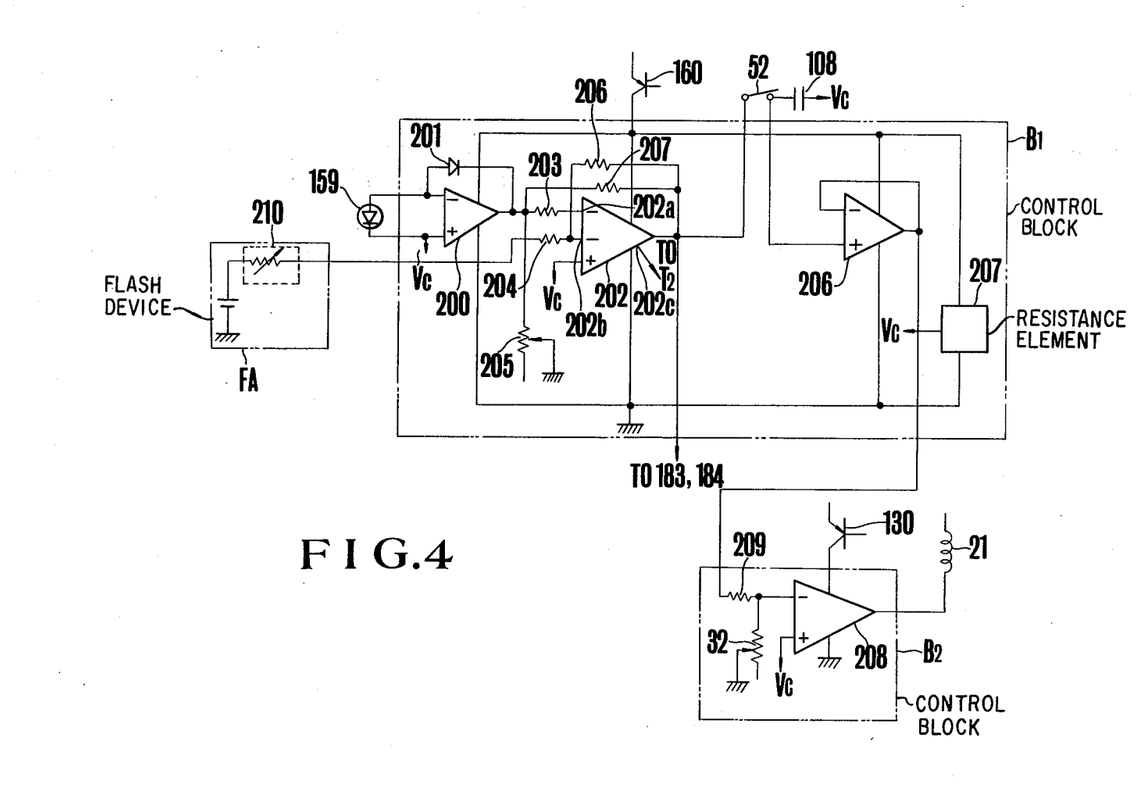
FIG. 4 shows in detail the light measuring circuit block $B_1$ and the control circuit block $B_2$ shown in FIG. 3.

In FIG. 4, 159 is the photoelectric element shown in FIG. 3, 200 an operational amplifier having two inputs connected to the output of the element 159, 201 a diode connected between the input terminal and the output terminal of the amplifier 200, 202 an operational amplifier presenting an inversing input terminal 202a connected to the output terminal of the operational amplifier 200 through the resistance 203, a second inversing input terminal 202b connected to the information setting circuit 210 of the flash device FA through the resistance 204 and a third input terminal connected to the bias current source Vc. Further the operation amplifier 202 presents a change over terminal 202c connected to the terminal $T_2$. Hereby when the charge completion signal is applied to the terminal 202c from the terminal $T_2$ the input terminal 202b is selected, while when the charge completion signal is not applied to the terminal 202c through the terminal $T_2$ the input terminal 202a is selected. 205 is the variable resistance whose value is set in accordance with the shutter time and the film sensitivity, 206 and 207 the resistances, 208 the operational amplifier composing a buffer circuit, presenting an input terminal connected to the output terminal of the operation amplifier 202 through the memory switch shown in FIG. 3, 207 the constant voltage current source and 210 the above mentioned information setting circuit with the resistance presenting the value corresponding to the aperture value determined by the electric flash device FA. 208 is an operational amplifier whose inversing input terminal is connected to the output terminal of the buffer circuit 206 through the resistance 209 and whose non inversing input terminal is connected to the bias current source Vc. 32 is the variable resistance shown in FIG. 2. Further the current source terminals of the operational amplifiers 200 and 206 are connected to the collector electrode of the transistor 160 shown in FIG. 3, the current source terminal of the operational amplifier 208 is connected to the collector electrode of the transistor 130 shown in FIG. 3 and the output terminal of the operational amplifier 208 is connected to the magnet 21.

Below the operation of the first embodiment will be explained in accordance with FIGS. 1–4.

When the shutter button 116 is pushed down to the first step the switch 186 is closed. At this time, the switches 156 and 185 are in the closed state while the switch 157 is connected to the side of 157a so that the transistors 103 and 104 are brought in the switched on state in such a manner that the transistor 160 is brought in the switched on state. Thus the operation result of the electrical signal from the photoelectric element 159 and the informations of the film sensitivity and the shutter time set at the resistance, namely the aperture value for obtaining the proper exposure is charged in the capacitor through the operational circuit 202 (FIG. 4).

When the shutter button 116 is pushed down further, the switch 114 is closed and the transistor 109 is brought in the switched on state while at the same time, the holding transistor 115 is also brought in the switched on state so that the transistor 109 is kept in the switched on state. Consequently, the current starts to be supplied to the control blocks $B_3$ and $B_4$ so as to make them ready for operation. Due to the start of the current supply the transistor 124 is brought in the switched off state so that the time constant circuit consisting of the condensers 119 and 120 and the resistance 118 starts to be charged. When the charge voltage of the condensers 119 and 120 goes up and reaches a level immediately before the operation of the control block $B_3$ the control block $B_6$ is brought in the switched on state, whereby the illuminating diode lights up due to the charge stored in the condenser 131. The diode 107 is put out by the opening of the switch when the shutter release button is freed so that the unnecessary power consumption can be avoided while the illuminating diode 133 lights up during the time proportional to the charge amount stored in the condenser. When the charge level of the condensers 119 and 120 further goes up after the diode 133 has lit up, the control block $B_3$ operates so as to trigger the monostable multivibrator circuit $B_4$. Consequently, square shaped driving pulses are applied to the magnet 48. When the magnet 48 is excited, the force of the permanent magnet 49 is compensated in such a manner that the armature holding lever 50 is rotated along the counter clockwise direction by means of the spring 50a so as to open the memory switch 52 by means of the pin 50b. Being composed as one body with the lever 50, the signal start lever 54 provided outside of the casing is rotated along the counter-clockwise direction, whereby the rotation is transmitted to the forked part 23a of the release lever 23 of the automatic aperture unit Ad. The release lever 23 is rotated along the clockwise direction against the force of the spring 23f, whereby in accordance to the amount of the rotation at first the hook part 23b disengages the rising up part 20b of the three forked lever 20. At this time, the automatic exposure control magnet 21 is supplied with a current through the current supply transistor 130 by the pushing down of the shutter button 116 in such a manner that the three forked lever 20 is attracted to the stop wheel claw 31 of the automatic exposure control unit Ae against the force of the spring 31a, so that no operation takes place even if the three forked lever 20 is disengaged, before the current supply is ceased. Further, by means of the rotation of the release lever 23, the fork part 23c rotates the Ae holding lever 30 along the clockwise direction. Then the holding plate of the sector gear 25 is freed and starts to be rotated along the clockwise direction against the force of the spring 25 by means of the spring 3a of the aperture preset ring 3 at the side of the lens through the signal lever 31. The gears 27 and 28 engaged with the sector gear 25 and stop wheel rotate in an accelerated way whereby the slide member 26 for the resistance, of the sector gear 25 also moves sliding over the surface of the resistance body so as to alter the value of the resistance 32. By means of the release of the above mentioned automatic exposure unit Ae, the value of the resistance 32 is altered as mentioned above and reaches a value corresponding to the aperture value stored in the capacitor 108, when the current supply to the automatic exposure control magnet 21 is stopped and the stop wheel claw 31 is rotated along the counter-clockwise direction by means of the spring 31a so as to stop the rotation of the stop wheel 29. In this way, the position of the rotary arm 3c of the aperture preset ring 3 engaged with the signal lever 33 is controlled, whereby the aperture value is determined.

Nearly at the same time with the release of the Ae holding lever 30, the holding claw 11 is rotated along the counter-clockwise direction by means of the end 23d of the above mentioned release lever 23 in such a manner that the automatic aperture energy storing lever 7 is released and rotated along the clockwise direction by means of the spring 7a. By means of the automatic aperture energy storing lever 7, the automatic aperture lever 6 is rotated as one body with the lever 7 along the clockwise direction by means of the common lever 10 in such a manner that the pin 4 of the diaphragm driving ring at the side of the lens is rotated along the clockwise direction so as to drive the diaphragm blades not shown in the drawing. Hereby the automatic aperture energy storing lever 7 is rotated along the direction along which the end 7b leaves the lower end 37b of the mirror driving lever 37 so that the mirror driving lever 37 is rotated along the counter-clockwise direction by means of the spring 37a. The mirror kick up lever coaxial with the mirror driving lever 37 is rotated along the same direction as one body with 39a of the kick up holding claw 39, so as to rotate the pin 40a of the kick up intermediary lever 40 along the counter-clockwise direction, whereby by means of 40b at the other end the mirror receiving plate 41 is kicked upwards around the shaft 41b as center through the pin 41a of the mirror receiving plate 41. Further, by means of the rotation of the mirror driving lever 37 the convex part 37d rotates the end 42a of the front shutter plane holding lever 42 along the clockwise direction whereby the hook part at the other end leaves the rising up part of the front shutter plane release bar 43 in such a manner that the release bar 43 rotates the front shutter plane holding lever 44 along the direction of the arrow A by means of the spring 43a so as to let the front shutter plane of the shutter mechanism not shown in the drawing start.

On the other hand with the operation of the control block $B_3$ the transistor 137 is brought in the switched on state and the current supply to the control block $B_5$ starts. Further when the front shutter plane runs, the switch 134 is opened by means of the front shutter plane so that the capacitor 135 starts to be charged through the resistance. After the elapse of the shutter time set at the resistance 136 the Schmitt-circuit $B_5$ is inversed and the magnet 181 is no more excited, when the rear shutter plane not shown in the drawing starts to run. At this time, the switch 156 in functional engagement with the operation of the rear shutter plane is opened so that all of the transistors 109, 137 and 130 serving to supply current to all control blocks are brought in the switched off state so as to cease the current supply to all the control blocks.

When as mentioned above the sequence for the exposure is carried out in order, the current is supplied to the magnet only during the setting operation of the photographic lens to the set aperture value so that a permanent current supply never takes place. Consequently, when the exposure sequence is carried out in a normal way, the abnormal consumption of the battery 152 never takes place.

However, if any irregularities exist between the yoke of the magnet 48 and the armature (FIG. 2), for example the magnet 48 has been magnetized along the reversed direction to that of the excitation pulses or the armature 51 and the yoke are bonded with each other due to the humidity, the automatic exposure control unit Ae (FIG. 2) is never released although the magnet 48 is excited. Consequently the diaphragm is never driven to the determined value at this time, so that the current is supplied to the control block $B_2$ permanently so as to consume the battery 152 abnormally. In the case of the present invention, when the photographer pushes down the battery check button BB, the change over switch 157 is connected to the side of 157b and the current supply to all the control blocks is interrupted so that the abnormal consumption of the battery 152 never takes place. Further, with the pushing down of the battery check button BB, the electrical circuit of the camera is reset at the initial state so that when the shutter button 116 is operated again after the irregularities are eliminated, the normal operation can be carried out. Further with the shutter termination signal due to the termination of the operation of the rear shutter plane, the signal lever 46 is rotated along the direction of the arrow B. Thus the rear shutter plane signal lever 45 is rotated along the counter-clockwise direction, the mirror return signal lever 47 is rotated along the clockwise direction and by means of the pin 47a, 39b of the mirror kick up holding claw 39 is rotated along the counter-clockwise direction in such a manner that the engagement of 39b with 38a of the mirror kick up lever 38 is solved so as to release the kicked up state of the mirror receiving plate 41, whereby the mirror resume the lower position by means of a spring not shown in the drawing. By means of the lower end of the mirror return signal lever 47 the automatic aperture return signal lever 12 is rotated along the counter-clockwise direction in such a manner that the pin 10a of the common lever 10 is rotated along the counter-clockwise direction so as to solve the engagement of the pin 10a with the rising up part 6b of the automatic aperture lever 6. The automatic aperture lever 6 is rotated along the counter-clockwise direction by means of the return spring 6a and the pin 4 of the diaphragm driving ring at the side of the lens follows the rotation of the automatic aperture lever 6 by means of a spring not shown in the drawing in such a manner that the diaphragm blades are opened so as to terminate the photographing.

In accordance with FIG. 2 to FIG. 4, an embodiment in which the current source circuit of the control circuit is interrupted by means of the battery check button BB so that the current supply holding state of the magnetic mechanism is released, whereby the same effect can be obtained if the electrical circuit is interrupted only for a short time.

Figure 5:
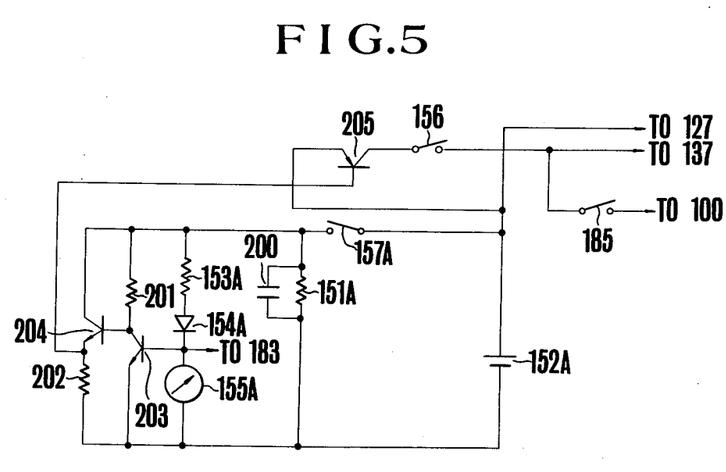
FIG. 5 shows a diagram an important part of another embodiment of the present invention.

FIG. 5 shows an embodiment for the latter case. FIG. 5 shows the circuit diagram of the second embodiment in which the present invention is applied to a camera, whereby the circuit is almost same as that shown in FIG. 3, so that only the elements different from those in FIG. 3 will be explained.

157A is a switch to be used instead of the current source voltage checker switch 157 shown in FIG. 3, 153 a resistance to be used instead of the limit resistance 153 shown in FIG. 3, 151A a dummy to be used instead of the dummy resistance 151 shown in FIG. 3, 154A a diode to be used instead of the diode 154 shown in FIG. 3, 155A a current source voltage display meter to be used instead of the meter 155 shown in FIG. 3 whereby the one end of the meter 155A is connected to the base of the transistor 203 and to the element 183 shown in FIG. 3. 152A is a battery to be used instead of the battery shown in FIG. 3, 200 a capacitor, 201 and 202 resistances, 203 and 204 npn transistors and 205 pnp transistor. Hereby 156 is a switch presenting the same efficiency as that of the switch 156 shown in FIG. 3, whereby the one end of the switch 156 is connected to the element 137 shown in FIG. 3 and to the element 100 through the switch 185.

Below the operation of the circuit shown in FIG. 3 will be explained.

When the checker switch 157A is brought in the switched on state, a large current flows through the capacitor 200 instantaneously in such a manner that the base potential of the transistor 203 is lowered so that the transistor 203 is brought in the switched off state. When the transistor 203 is brought in the switched off state, the transistor 204 is brought in the switched on state whereby the base potential of the transistor 205 is raised and the transistor 205 is brought in the switched off state for a moment by means of the capacitor 200. Thus the current supply circuit (FIG. 3) consisting of transistors is reset in such a manner that the abnormal consumption of the battery 152A can be avoided. Hereby after the elapse of a certain determined time after the operation of the checker switch 157A, the meter 155A displays the current source voltage.

Figure 6:
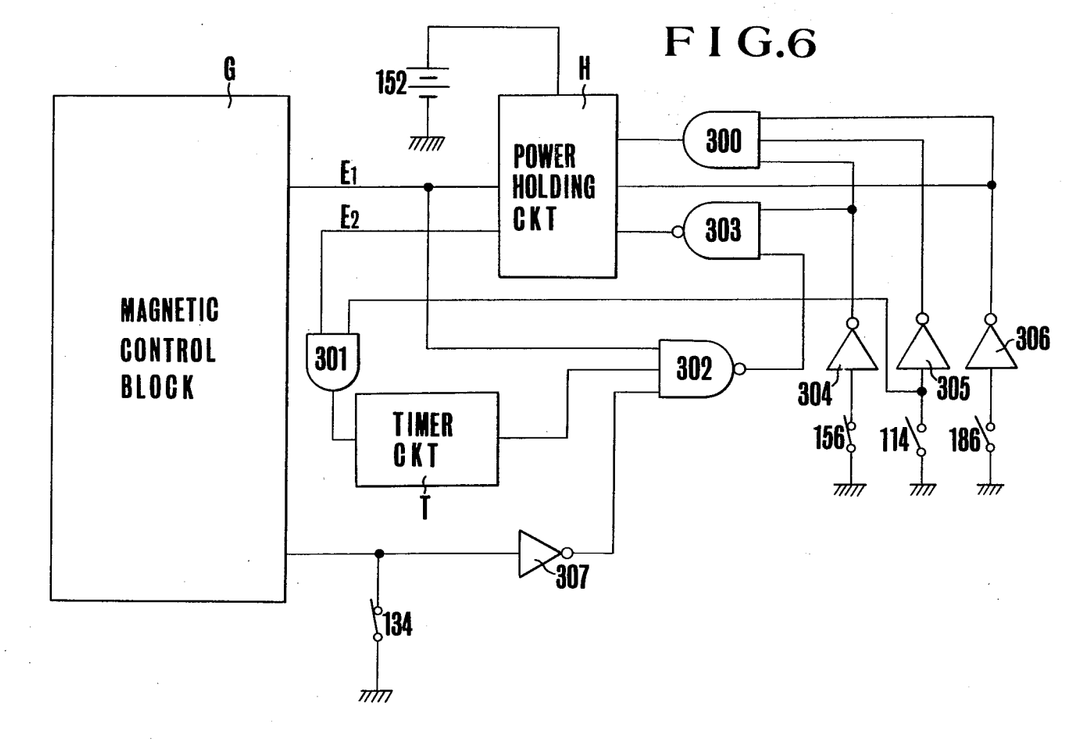
FIG. 6 shows a block diagram of the important part of the third embodiment of the present invention.

In the above mentioned first and the above mentioned second embodiment, the current supply holding state is manually reset, while FIG. 6 shows an embodiment in which the current supply holding state is automatically reset. In FIG. 6, G is the magnetic control block to be explained later, H the current source control and holding block to be explained later, T the timer circuit to be explained later, 300 and 301 the AND gates, 302–303 and 304–307 the NAND gates and the inverters. 114, 134, 156 and 186 are the switches presenting the same efficiency as 114, 134, 156 and 186 shown in FIG. 3.

Figure 9:
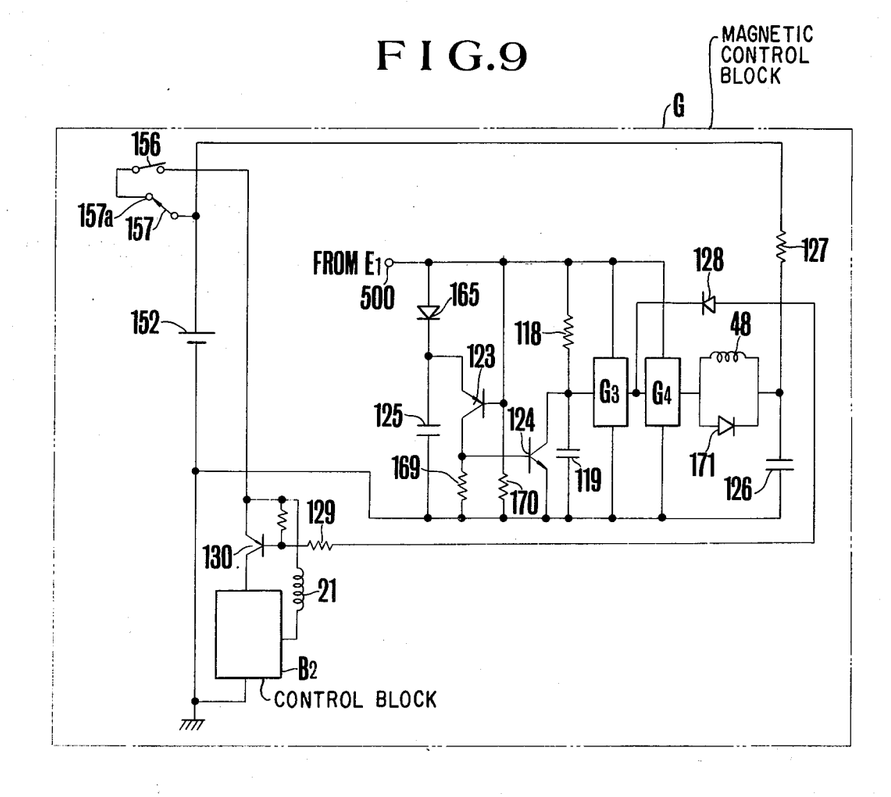
FIG. 9 shows in detail the circuit diagram of the block G of the embodiment shown in FIG. 6.

Below, the block H shown in FIG. 6 will be explained in detail in accordance with FIG. 7. 310 is the terminal to be connected to the output terminal of the AND circuit 300 shown in FIG. 6. 311 the terminal to be connected to the output terminal of the inverter 306, 312 the terminal to be connected to the output terminal of the NAND circuit 303, 313–320 the elements for composing the current supply holding circuit, 313 and 317 the transistors, 314, 315, 318 and 319 the resistances, 316 the diode, 320 the capacitor, 321, 322, 325, 326, 328 and 332 the transistors, 323, 324, 330 and 331 the resistances and 327 and 329 the diodes. Hereby the emitter electrode of the transistor 321 is connected to the current source 152 (FIG. 9).

Below, the block T shown in FIG. 6 will be explained in detail in accordance with FIG. 8.

Figure 8:
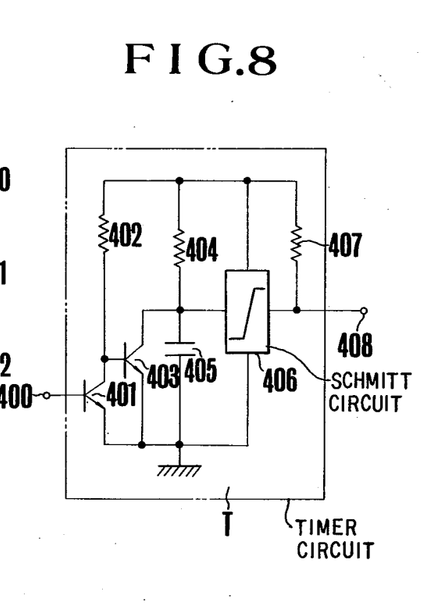
FIG. 8 shows in detail the circuit diagram of the block T of the embodiment shown in FIG. 6.

In FIG. 8, 400 is the input terminal to be connected to the base electrode of the npn transistor 401, being connected to the output terminal of the AND circuit 301. 402, 404 and 407 are the resistances, 403 the npn transistor, 405 the capacitor for forming a time constant circuit together with the resistance 404, 406 the Schmitt-circuit and 408 the output terminal to be connected to the input terminal of the NAND circuit 302 shown in FIG. 6, being connected to the output terminal of the Schmitt-circuit 406.

Lastly, the block G shown in FIG. 6 will be explained in detail.

In FIG. 9, 500 is the terminal to be connected to the collector electrode of the transistor of the block H, whereby other elements than the terminal 500 present the same composition as those presenting the same figures in FIG. 3, so that their explanations will be omitted. Hereby FIG. 9 shows only the important parts.

Below the operation of the third embodiment will be explained in accordance with FIGS. 6 to 9.

Figure 7:
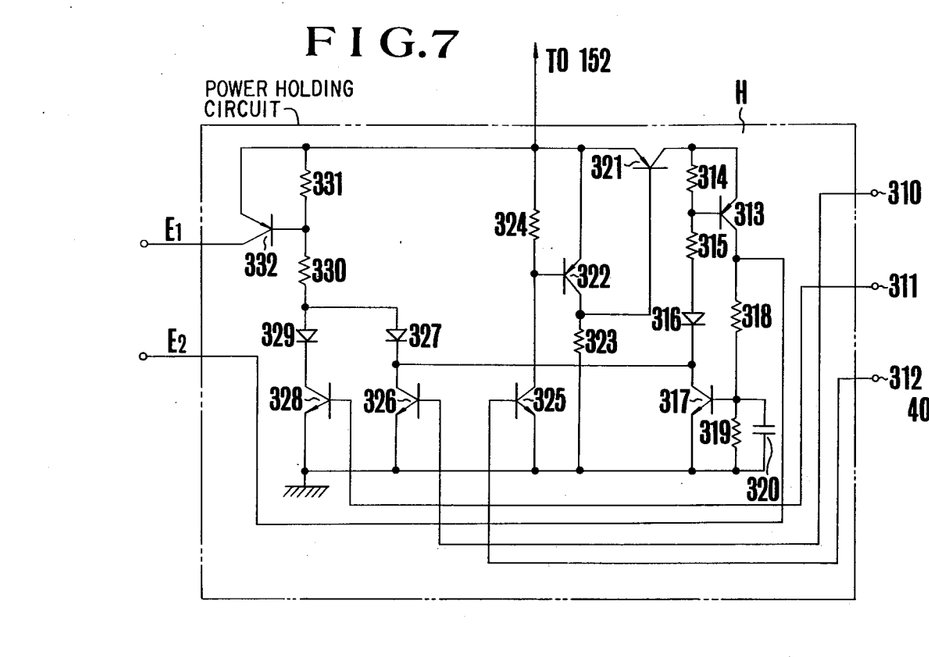
FIG. 7 shows in detail the circuit diagram of the block H of the embodiment shown in FIG. 6.

When at first with the pushing down of the shutter button the switch 186 is closed, the output of the inverter becomes "1", whereby the transistors 328 and 332 shown in FIG. 7 are brought in the switched on state in such a manner that the current is supplied to all the circuit shown in FIG. 9 through the terminal 500. When then with the further pushing down of the shutter button, the switch 114 is closed, all the input terminals of the AND circuit 300 are at "1" so that the output of the AND circuit 300 is also "1" so as to bring the transistor 326 shown in FIG. 7 in the switched on state. When the transistor 326 is brought in the switched on state a current flows through the base of the transistor 313 so that the transistor 313 is brought in the switched on state, whereby a base current flows through the base of the transistor 317. Consequently, the transistor 317 is also brought in the switched on state. When then the shutter button is freed and the switches 114 and 186 in functional engagement of the shutter button are opened, the output of the AND gate 300 becomes "0" in such a manner that the transistor 326 shown in FIG. 7 is brought in the switched off state, while a base current still flows through the base of the transistor 313 through the transistor 317 forming the current supply holding circuit so that the transistor 313 is kept in the switched on state. Further as explained above in functional engagement of the change over of the switch 114 into the switched off state the switch 186 is brought in the switched off state, when the transistor 328 shown in FIG. 7 is also brought in the switched off state, whereby a base current flows through the base of the transistor 332 through the resistance 330, the diode 327 and the transistor 317 so that the transistor 332 is kept in the switched on state in such a manner that the current is still supplied to all the circuit shown in FIG. 9.

On the other hand, when the current supply holding circuit operates as mentioned above the current source line $E_2$ (FIG. 7) assumes "1". At this time, the switch 114 is in the switched off state so that the output of the AND circuit 301 becomes "1" in such a manner that the timer circuit T (FIG. 8) starts to operate. In the case of the normal operation, as explained in case of the first embodiment, at the termination of the exposure sequence the switch 156 (FIGS. 6 and 7) is opened in functional engagement with the operation of the rear shutter plane so that the output of the NAND circuit 303 becomes "1" whereby the transistors 325 and 322 (FIG. 7) are brought in the switched on state. Consequently, the transistor 321 (FIG. 7) is brought in the switched off state so as to reset the current supply holding circuit, whereby the transistor 332 is also brought in the switched off state so as to interrupt the current supply to the exposure control circuit shown in FIG. 9. Thus in case of the normal exposure sequence the abnormal deterioration of the battery can be avoided.

On the other hand, even when the magnet 48 (FIG. 9) is out of order, the current is still supplied to the magnet 21 (Explanation for the first embodiment).

However, in the case of the third embodiment, at the same time when the shutter button is freed, the timer circuit T starts to operate (FIG. 8). After the elapse of the time determined by the resistance 404 and the capacitor 405, the output of the output terminal 408 becomes "1". Thus one of the input to the NAND circuit 302 shown in FIG. 6 becomes "1". On the other hand, at this time the current supply circuit (FIG. 7) is in the set state so that the output of the current source line $E_1$ (FIG. 7) is 1, while the start switch 134 for the time control circuit is in the switched on state, so that all the inputs to the NAND circuit 302 are "1". Thus after the elapse of a time, set at the timer circuit T after the shutter button is freed, by means of the output of the timer circuit T the output of the NAND circuit 302 becomes "0", while the output of the NAND circuit 303 (FIG. 6) becomes "1". Consequently the current supply holding circuit (FIG. 6) is reset and the output of the current source line $E_1$ (FIG. 6) becomes "0", when the transistor 130 shown in FIG. 9 is brought in the switched off state in such a manner that the current supply to the magnet 21 is interrupted. In consequence the abnormal deterioration of the battery 152 due to the breakage of the magnet 48 can automatically be prevented by means of the timer circuit T.

As explained above in the case of the holding release system in accordance with the present invention, the circuit for controlling the magnetic release mechanism is supplied with current through the self-holding circuit in such a manner that the permanent current supply to the circuit and the non-sequence-operation can be avoided when the magnetic release device does not operate for same reason and the complete sequence operation is not carried out to the last in the case of a circuit in which, at the termination of the sequence operation, a reset signal is produced so as to interrupt the current supply to the magnetic circuit, whereby by providing a reset circuit for the above purpose the release of the above mentioned circuit supply holding as well as the reopening of the sequence operation can be carried out in such a manner that the consumption of the battery due to the magnetic mechanism and the sequence non-operation can be avoided.

What is claimed is:

1. A photographic camera comprising:
    (a) a power supply source for producing a driving circuit;
    (b) magnetic control mechanism means having at least an electromagnet and an operation control circuit for the electromagnet and for controlling an exposure of the camera;
    (c) a shutter release means;
    (d) power supply holding means connected between the power supply source and the magnetic control mechanism for controlling the supply of the driving current from the power supply source and the magnetic control mechanism, said power supply holding means holding the supply of the driving current in response to the operation of the shutter release means;
    (e) a battery checking button provided in the camera; and
    (f) resetting means connected functionally to the power supply holding means and responsive to the operation of the battery checking button for forcibly resetting the power supply holding means so that the supply of the driving current is interrupted after the exposure sequence of the camera is interrupted.

2. A photographic camera comprising:
    (a) a power supply source for producing a driving current;
    (b) magnetic control mechanism means having at least an electromagnet and an operation control circuit for the electromagnet and for controlling an exposure of the camera;
    (c) shutter release means;
    (d) power supply holding means connected between the power supply source and the magnetic control mechanism for controlling the supply of the driving current from the power supply source to the magnetic control mechanism, said power supply holding means holding the supply of the driving current in response to the operation of the shutter release means;
    (e) first resetting means for resetting the power supply holding means so that the supply of the driving current is interrupted when an exposure sequence of the camera is completed;
    (f) a battery checking button provided in the camera; and
    (g) second resetting means connected functionally to the power supply holding means and responsive to the operation of the battery checking button for forcibly resetting the power supply holding means so that the supply of the driving current is interrupted after the exposure sequence of the camera is interrupted.

3. A photographic camera comprising:
    (a) a power supply source for producing a driving current;
    (b) magnetic control mechanism means having at least an electromagnet and an operation control circuit for the electromagnet and for controlling an exposure of the camera;
    (c) shutter release means;
    (d) power supply holding means connected between the power supply source and the magnetic control mechanism for controlling the supply of the driving current from the power supply source to the magnetic control mechanism, said power supply holding means holding the supply of the driving current in response to the operation of the shutter release means, (e) a timer circuit which starts functioning after commencement of the exposure sequence and generates an output signal after a lapse of a predetermined period of time; and
(f) resetting means connected to the power supply holding means for resetting the power supply holding means in response to the output of the timer means in order to interrupt the supply of the driving current after the exposure sequence of the camera has been interrupted.

4. A photographic camera comprising:
(a) a power supply source for producing a driving current;
(b) magnetic control mechanism means having at least an electromagnet and an operation control circuit for the electromagnet and for controlling an exposure of the camera;
(c) shutter release means;
(d) a power supply holding means connected between the power supply source and the magnetic control mechanism for controlling the supply of the driving current from the power supply source to the magnetic control mechanism, said power supply holding means holding the supply of the driving current in response to the operation of the shutter release means;
(e) first resetting means for resetting the power supply holding means so that the supply of the driving current is interrupted when an exposure sequence of the camera is completed;
(f) a timer circuit which starts functioning after commencement of the exposure sequence and generates an output signal after a lapse of a predetermined period fo time; and
(g) second resetting means connected to the power supply holding means for resetting the power supply holding means in response to the output signal from the timer circuit in order to interrupt the supply of the driving current after the exposure sequence of the camera has been interrupted.

5. A photographic camera according to claim 4, wherein the timer circuit including an RC time constant circuit to be enabled in response to the commencement of the exposure sequence and a switching circuit responsive to the output of the RC time constant circuit.

6. A photographic camera comprising:
(a) a power supply source for producing a driving current;
(b) magnetic control mechanism means having at least an electromagnet and an operation control circuit for the electromagnet and for controlling an exposure of the camera;
(c) shutter release means;
(d) power supply holding means connected between the power supply source and the magnetic control mechanism for controlling the supply of the driving current from the power supply source to the magnetic control mechanism, said power supply holding means holding the supply of the driving current in response to the operation of the shutter release means;
(e) first resetting means for resetting the power supply holding means so that the supply of the driving current is interrupted when an exposure sequence of the camera is completed;
(f) short-circuit means, including at least one capacitor to be connected in parallel with the power supply source after the exposure sequence of the camera is interrupted; and
(g) means for disconnecting for a short time the power supply source from the power supply holding means in response to the voltage change at the output terminal of the short-circuit means to reset the power supply holding means.

7. A photographic camera according to claim 6, wherein the short-circuit means including a capacitor and a resistor connected in parallel to the capacitor.